M. HOLLAND.
LICENSE TAG BRACKET.
APPLICATION FILED APR. 17, 1914.
1,156,685.
Patented Oct. 12, 1915.
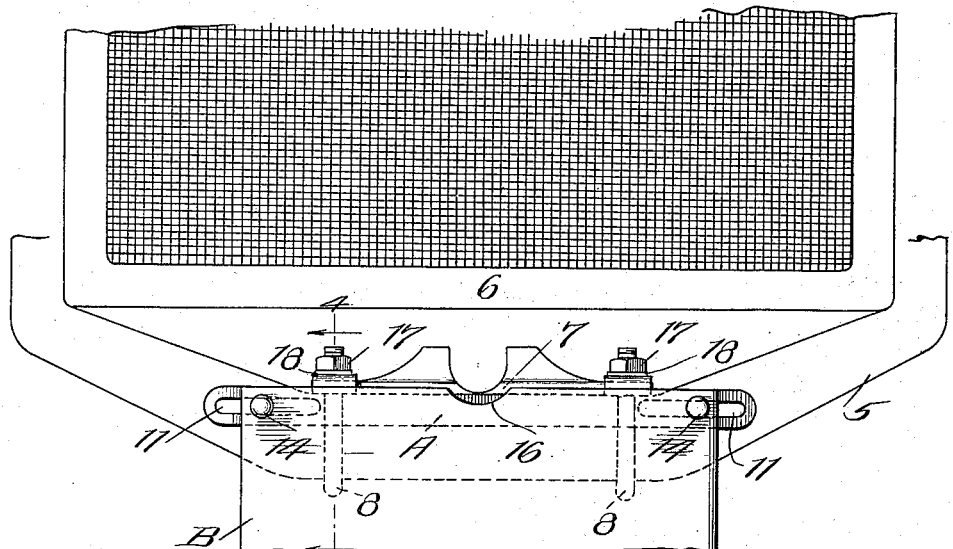
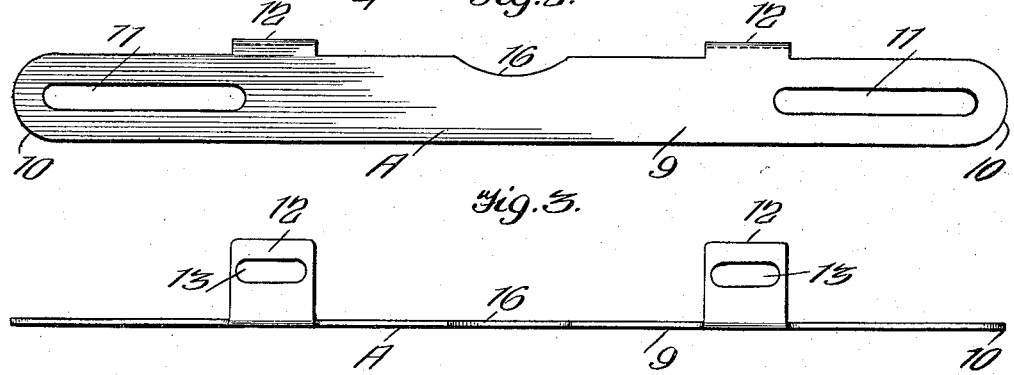
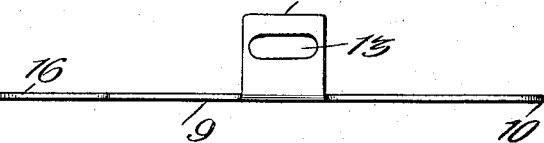
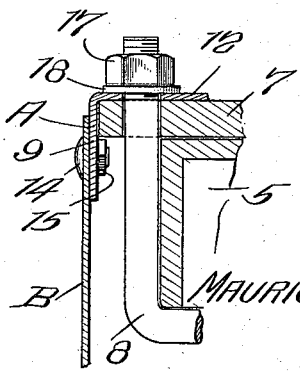
WITNESSES
INVENTOR
MAURICE HOLLAND,
BY
ATTORNEYS

UNITED STATES PATENT OFFICE.

MAURICE HOLLAND, OF PROVIDENCE, RHODE ISLAND.

LICENSE-TAG BRACKET.

1,156,685.   Specification of Letters Patent.   Patented Oct. 12, 1915.

Application filed April 17, 1914. Serial No. 832,517.

*To all whom it may concern:*

Be it known that I, MAURICE HOLLAND, a citizen of the United States, and a resident of Providence, in the county of Providence and State of Rhode Island, have invented a new and useful Improvement in License-Tag Brackets, of which the following is a specification.

This invention relates to brackets, and more particularly to brackets designed for holding license tags for automobiles.

One of the principal objects of the invention is to provide a bracket designed primarily for the attachment of license tags or plates to Ford automobiles.

Another object of the invention is to provide a bracket which will be extremely simple in its structure, which may be easily and quickly attached without the use of special tools, and which may be secured in place without alteration of any of the machine parts.

With these and other objects in view which will become apparent as the description proceeds, the invention resides in the construction, combination and arrangement of parts hereinafter more fully described and claimed, and illustrated in the accompanying drawing in which like characters of reference indicate like parts throughout the several figures, of which—

Figure 1 illustrates a front elevational view of the forward portion of an automobile, showing the manner of attaching the bracket, Fig. 2 illustrates a front elevational view of the bracket, Fig. 3 illustrates a top plan view thereof, and Fig. 4 illustrates a sectional view taken on the plane indicated by the line 4—4 of Fig. 1.

Referring more particularly to the drawing, 5 illustrates the forward cross bar of the body frame of an automobile, 6 indicates the radiator, 7 indicates the plate in which the starting crank rests and 8 indicates the U-shaped clips whereby the front springs, not shown, are secured in place in the bar 5. The construction of these parts is of the usual type.

The bracket is indicated at A, and comprises a flat strip of metal 9, rounded at its ends as at 10, and provided near its ends with elongated medially disposed slots 11, and formed integrally with the strip and disposed in spaced relation to each other and to the ends of the strip are a pair of securing lugs 12, which extend at right angles to the plane of the strip 9, and lie in a common plane with each other, and are provided with elongated transversely disposed slots 13. A license plate or tag is illustrated at B, and is provided near its upper corners with short bolts 14, which extend through the slots 11 and are provided with nuts 15 whereby the plate may be removably secured to the bracket. Midway of its length the strip 9 is recessed on its upper edge as at 16, to provide room for the starting crank.

By constructing the bracket in this manner, provision is made for the use of the bracket as a support and journal for the starting crank of the automobile, when the bearing block or plate 7 is removed.

In securing the bracket to the automobile, the nuts 17 provided on the forward arms of clips 8 for securing the latter, are removed and the ears 12 are slipped down over the upper ends of the clips, the latter extending through the slots 13, and the nuts 17 may then be replaced, securely holding the bracket in place. If washers for nuts 17 are used as at 18, they are of course removed so that they may be replaced over the ears when the bracket is secured to the automobile, as will be readily understood. Slots 11 are made relatively long, so that license plates having bolts disposed at various distances apart may be accommodated, and the slots 13 are elongated to allow for any variations which may occur in the distance apart of the clips in various machines.

A bracket constructed according to the foregoing description, will be extremely simple and durable in construction, and may be attached or detached in a very short time, and without the requirement of any special tools, and without in any way altering the structure of the automobile.

Although I have described the preferred embodiment of my invention, I may desire to make such changes in the construction, combination and arrangement of parts as do not depart from the spirit of the invention and the scope of the appended claim.

I claim:

A bracket comprising a body formed of a rigid strip of material having slots occurring adjacent its ends, ears formed on the strip and extending at right angles thereto and provided adjacent their outer ends with
5 slots, said body having its upper edge provided centrally with a recess to receive a starting crank whereby the bracket may be utilized as a bearing and support for the crank.

MAURICE HOLLAND.

Witnesses:
EMILY NORTH MURPHY,
PATRICK P. CURRAN.

Copies of this patent may be obtained for five cents each, by addressing the "Commissioner of Patents, Washington, D. C."